United States Patent

Terzi et al.

[11] Patent Number: 5,481,970
[45] Date of Patent: Jan. 9, 1996

[54] MACHINE FOR THE OFFSET PRINTING OF FLAT OBJECTS, IN PARTICULAR FOR COMPACT DISCS

[75] Inventors: Fermo Terzi, Fabbrico; Massimo Verona, Reggio Emilia, both of Italy

[73] Assignee: O.M.S.O. S.P.A., Reggio Emilia, Italy

[21] Appl. No.: 220,910

[22] Filed: Mar. 30, 1994

Related U.S. Application Data

[63] Continuation of Ser. No. 100,032, Jul. 30, 1993, abandoned.

[30] Foreign Application Priority Data

Jul. 31, 1992 [IT] Italy ................................. Re92A0063

[51] Int. Cl.⁶ ..................................................... B41L 9/04
[52] U.S. Cl. ............................................ 101/146; 101/232
[58] Field of Search ........................... 101/37, 40.1, 146, 101/232, 233, 234, 240, 250

[56] References Cited

U.S. PATENT DOCUMENTS 1,447,334  3/1923  Bacon ..................................... 101/232
3,122,994  3/1964  Crabtree et al. .
3,595,164  7/1971  Hovekamp ............................... 101/37
3,895,574  7/1975  Nyborg .................................... 101/37
4,246,840  1/1981  Yoshino et al. ........................... 101/37
4,271,757  6/1981  Maxwell et al. .

FOREIGN PATENT DOCUMENTS 0133511   7/1984   European Pat. Off. .
572551    3/1933   Germany .................................. 101/37
1081900   5/1960   Germany .
1956109   5/1971   Germany .................................. 101/37
3113155   5/1991   Japan .
4332932   11/1992  Japan .
931906    7/1963   United Kingdom .
1156209   6/1969   United Kingdom .................... 101/40.1

Primary Examiner—Eugene H. Eickholt
Attorney, Agent, or Firm—Christopher R. Pastel; Thomas R. Morrison

[57] ABSTRACT

A printing machine of offset type for compact discs comprises at least one printing cylinder for at least one color driven with uniform rotary motion and a chain conveyor driven with intermittent motion for feeding the objects to be printed.

5 Claims, 5 Drawing Sheets

MACHINE FOR THE OFFSET PRINTING OF FLAT OBJECTS, IN PARTICULAR FOR COMPACT DISCS

This application is a continuation application of application Ser. No. 08/100,032 filed Jul. 30, 1993 and now abandoned.

The purpose of the present invention is to confront the problem of the offset printing of flat objects, such as compact discs.

The ever increasing distribution of this type of object has made it essential in practice to subject them directly to the multi-colour printing of the brand names and other information required to identify their contents.

Such articles are currently offset printed on machines comprising an object conveyor which advances at constant speed below at least one printing station, the printing cylinder of which carries a series of equidistant cylindrical segment-shaped printing plates which have collected the image inked in the various inking stations positioned peripherally to the printing cylinder, and deposit it on the objects as they pass below them.

The circumferential distance apart of said printing plates equals the linear distance between the objects to be printed which advance on the underlying conveyor, the peripheral speed of the printing plates being exactly equal to the rectilinear speed of the underlying conveyor.

With this type of machine, which has proved suitable for printing large flat objects, problems arise when used for printing particularly delicate objects.

In this respect, it is virtually impossible to accurately position a delicate object such as a compact disc on a moving conveyor feeding it below a printing station without subjecting the object to impacts and jolting which could damage it.

Again, an offset printing machine could not be operated intermittently because the cyclic stoppage of the printing cylinder would compromise the proper operation of the inking rollers.

The object of the present invention is to obviate the aforesaid drawback by providing an offset printing machine for delicate flat objects, in which the conveyor feeding the objects below the printing cylinder advances with intermittent movement comprising halt periods separated by movement periods during which the conveyor undergoes acceleration, then a period of uniform movement and then deceleration, its linear speed during the period of uniform movement being equal to the peripheral speed of the printing plates located on the printing cylinder, which instead rotates with uniform movement.

The halt periods are sufficiently long to enable the objects to be loaded onto and discharged from the conveyor.

The printing plates carried peripherally by the printing cylinder are spaced apart by a distance depending on the halt and movement periods of the underlying conveyor, so that the printing cylinder can continue to rotate with uniform movement to hence allow correct inking of the printing plates, even when the underlying conveyor cyclically stops.

The merits and operational and constructional characteristics of the invention will be more apparent from the detailed description given hereinafter with reference to the figures of the accompanying drawings, which illustrate a preferred embodiment of the invention by way of non-limiting example.

Figure 1:
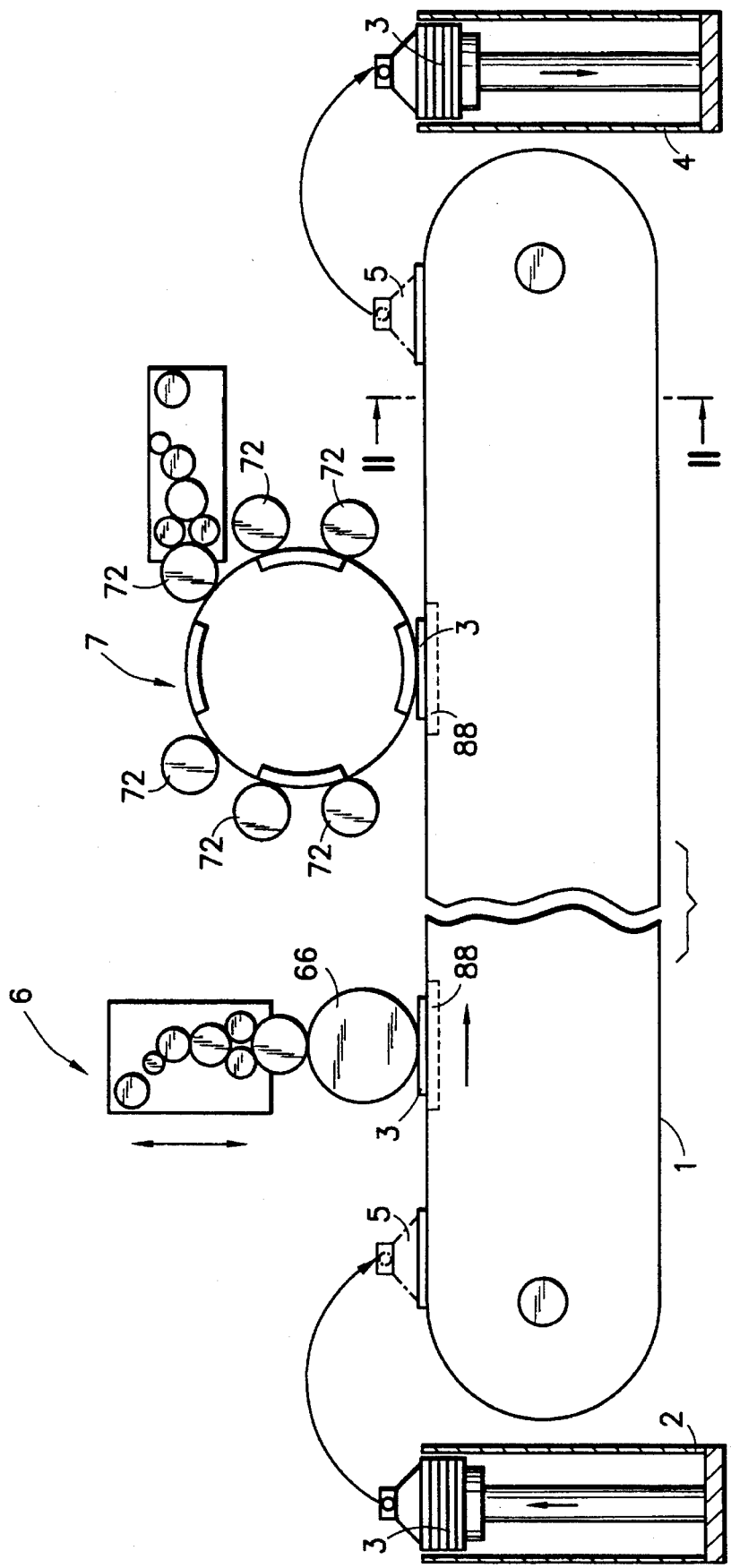
FIG. 1 is a schematic side view of the invention.

The figures show a conveyor 1 positioned between a device 2 for loading the objects 3 to be printed and a device 4 for collecting the printed objects 3.

Sucker means 5 are provided between the devices 2 and 4 and the conveyor 1 to withdraw the objects from the device 2 and place them on the conveyor 1, and to withdraw the objects from the conveyor 1 and place them in the device 4 after printing.

In the illustrated embodiment two printing units 6 and 7 respectively are positioned above the upper portion of the conveyor 1.

The device 6 is a single-colour device comprising a printing cylinder 66 which is brought into contact with the underlying object 3 moving along the conveyor 1.

In the illustrated embodiment the printing device 7 is a six-colour device in which the inking stations have been omitted for clarity of drawing, only one of them being indicated schematically.

Four equidistant printing plates 71 of suitable material are positioned on the printing cylinder 77 to receive the image inked in its various colours by the six inking rollers and transfer it onto the object 3, which is carried below the cylinder 77 by the conveyor 1.

The conveyor 1 consists of a strong central tubular frame 8 (FIG. 2) carrying slide guides 9 on its upper side and lower side.

Two mutually facing slide guides 9 are provided on each of the upper and lower sides and are each composed of three parts 91, 92 and 93, so that overall they create slide tracks for wheels of vertical axis and horizontal axis as described hereinafter.

Figure 7:
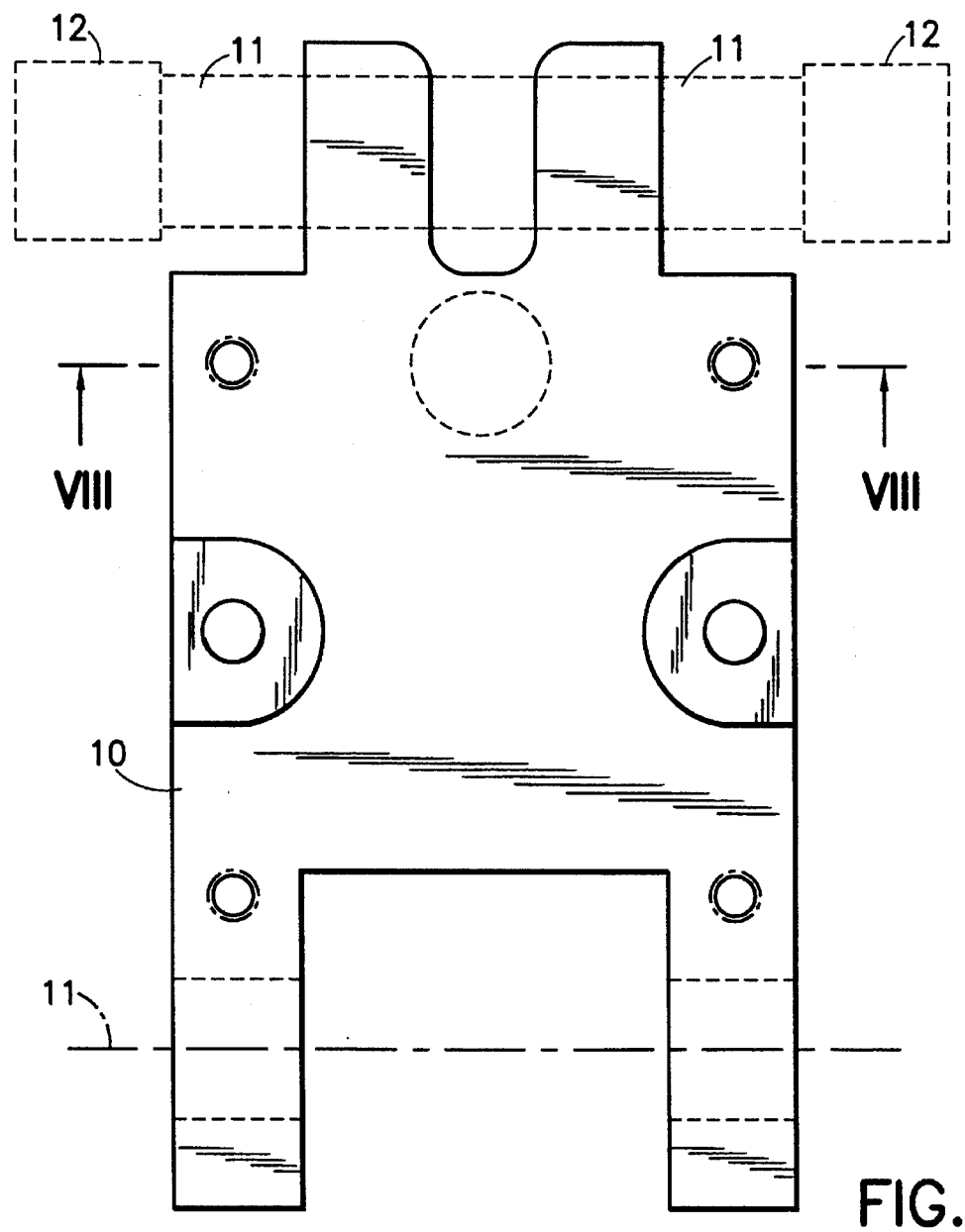
FIG. 7 is a plan view of one of the constituent plates of the object feed conveyor.
Figure 8:
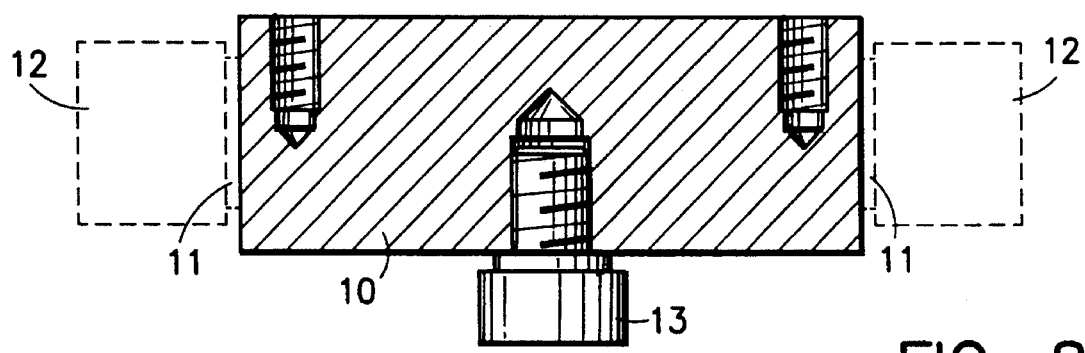
FIG. 8 is a section on the line VIII—VIII of FIG. 7.

The conveyor 1 slides on the frame 8 after passing about two end toothed wheels, not shown, and is composed of a series of links in the form of plates 10, better seen in FIGS. 7 and 8, which externally carry wheels 12 on their mutual hinging axes 11, and lowerly carry a centering wheel 13 with its axis perpendicular to the hinging axis 11.

Figure 2:
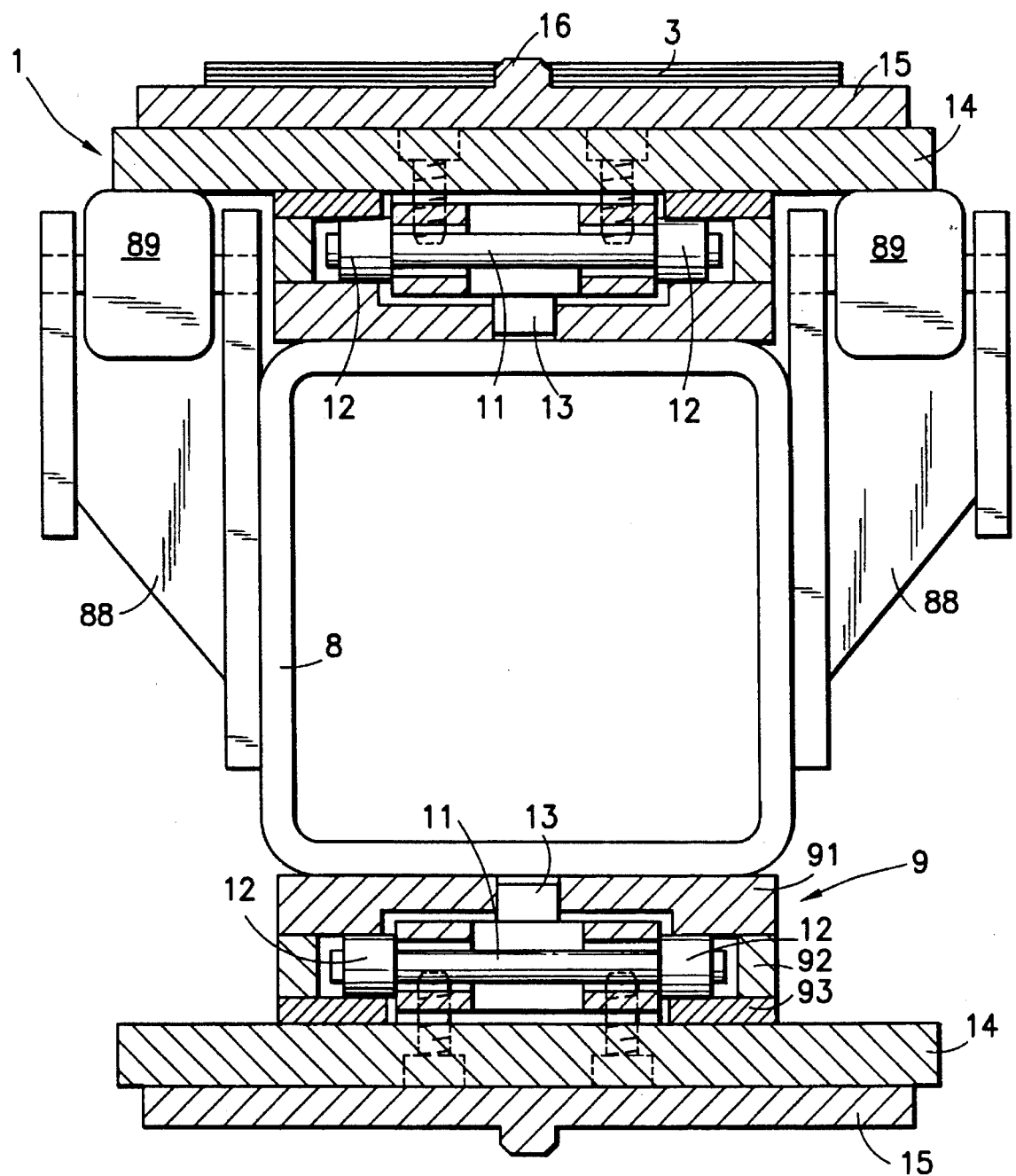
FIG. 2 is a section on the line II—II of FIG. 1.

The wheels 12 and 13 slide in the tracks created by the guides 9 as stated, and as can be seen in FIG. 2.

On the opposite side to that comprising the wheel 13 each constituent plate 10 of the chain supports a slab 14 of treated steel, projecting laterally from the guides 9.

A seat 15 for receiving one of the objects to be printed is fixed at regular intervals on each slab 14. The seats 15 centrally comprise a projecting pin 167 to be inserted into the central hole in a compact disc 3, which is thus maintained in a fixed position during the printing operations.

During the operation of the machine the pin 16 is received in a cavity, not shown, provided in the cylinder 66 and in the printing plates 71.

Two series of aligned support rollers 89 are fixed by brackets 88 to the sides of the central frame 8 on those portions below the printing stations 6 and 7 to act as a sliding support for the slabs 14, hence providing rigidity to the system during printing.

Figure 3:
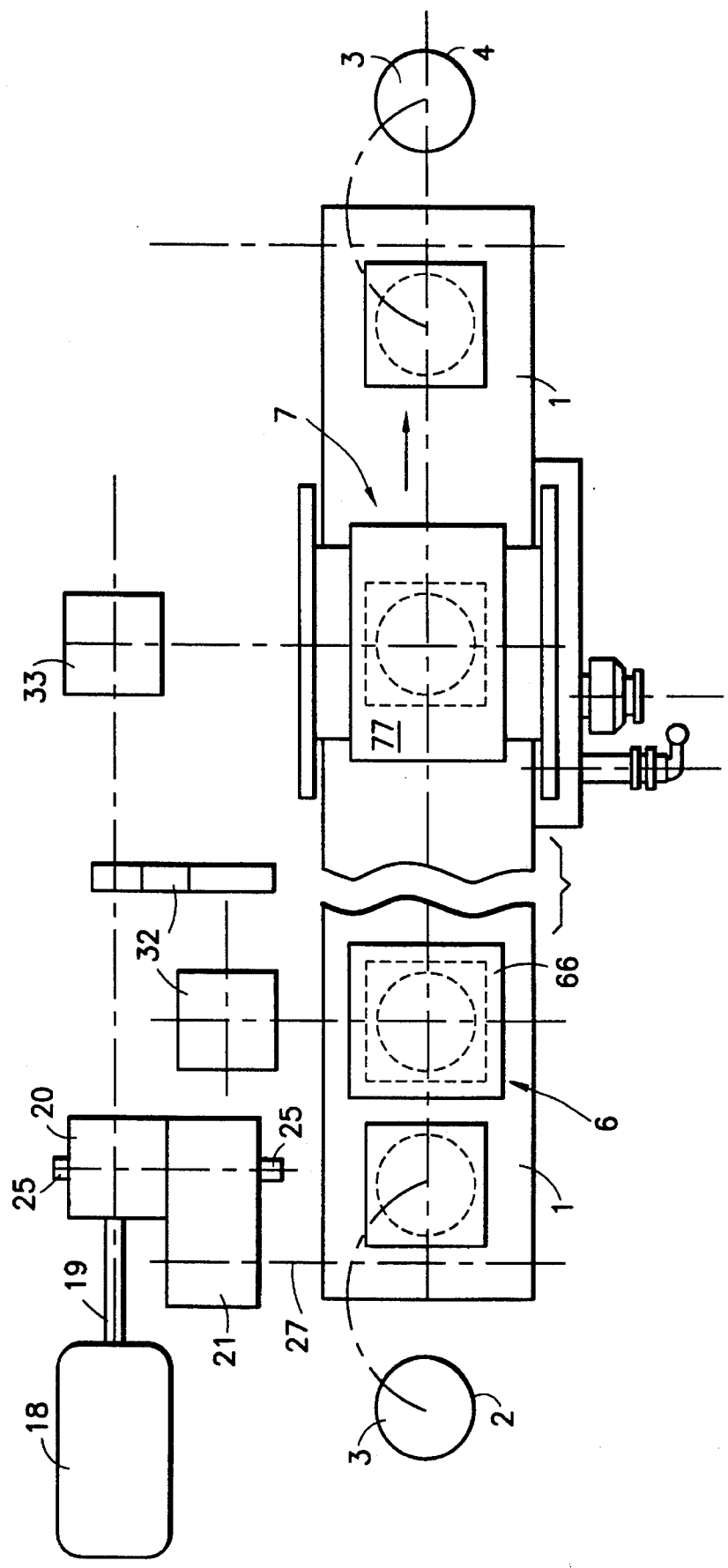
FIG. 3 is a schematic plan view of the invention.

With particular reference to FIG. 3 it can be seen that the machine comprises a single motor 19 which via a first step-down gear 20 operates a programmer mechanism 21 responsible for the intermittent movement of the conveyor 1.

Figure 4:
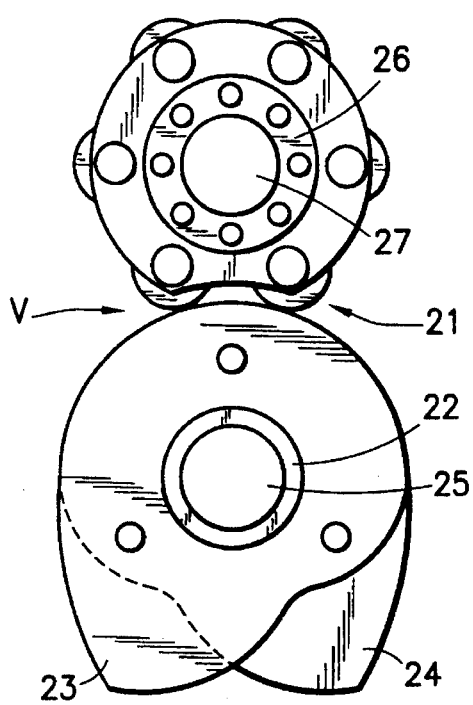
FIG. 4 is a front view of the device which transmits intermittent movement to the conveyor.
Figure 5:
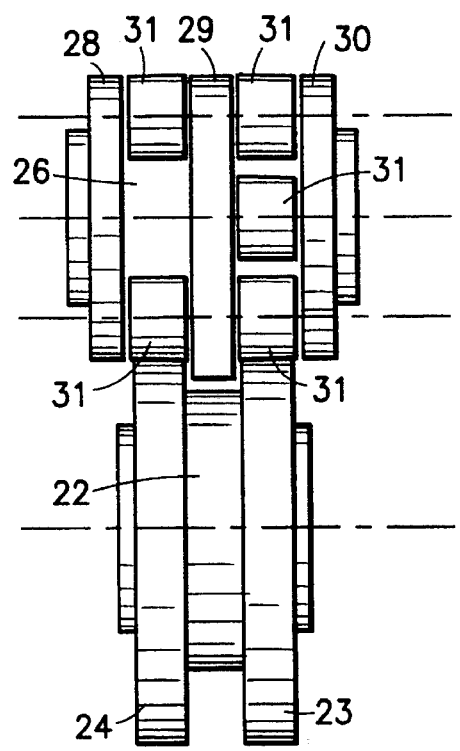
FIG. 5 is a view in the direction V of FIG. 4.

The programmer mechanism 21 is shown in FIGS. 4 and 5, and consists of a bush 22 carrying two facing parallel flat cams 23 and 24 of antisymmetrical development.

The bush is keyed onto the output shaft 25 of the step-down gear 20 and is rotatably supported by an external structure, not shown, which supports a second bush 26 which receives and is coupled to the exit shaft 27 of the device.

The bush 26 connects together three parallel plates 28, 29 and 30, between which there are positioned two groups each of three equidistant idle rollers 31.

The two groups of three rollers positioned between the plates 28 and 29 and between the plates 29 and 30 are arranged to interact with the described cams 23 and 24 respectively, and are displaced by sixty degrees from each other.

The exit shaft 27 is connected to one of the toothed wheels about which the conveyor 1 passes and is driven.

Figure 6:
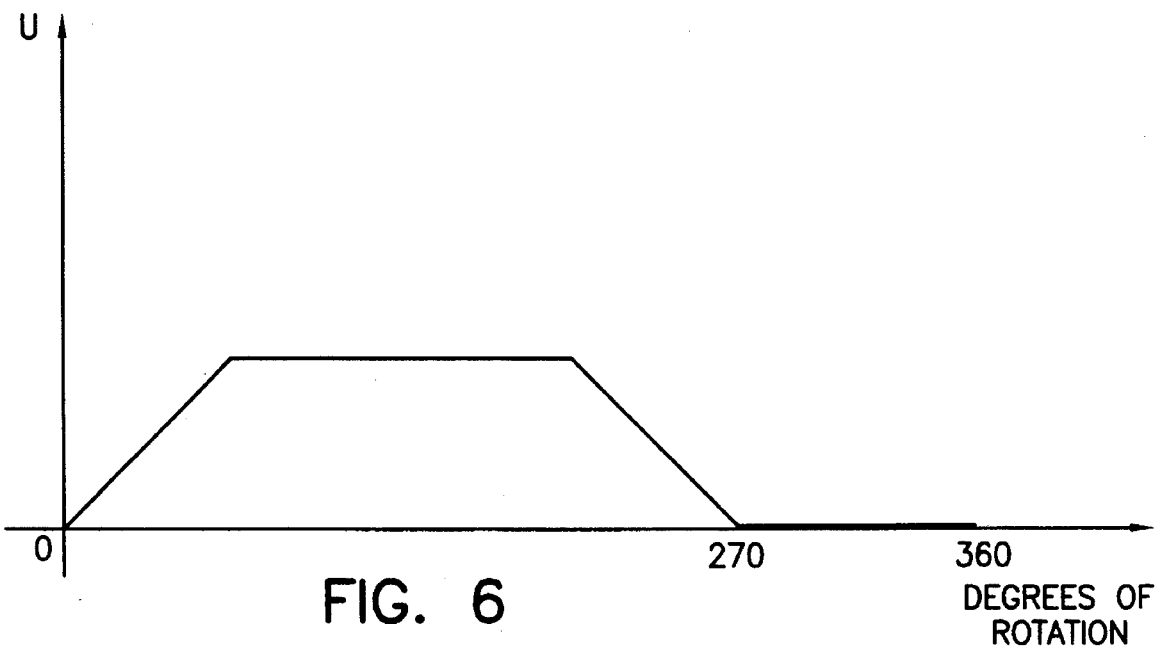
FIG. 6 is a diagram showing the conveyor speeds during one working cycle, as imposed by the devices shown in FIG. 4 and FIG. 5.

Because of the aforedescribed configuration, as can be seen from FIG. 6 the exit shaft 27 and hence the conveyor 1 are driven with intermittent movement comprising a first stage corresponding to 270 degrees of rotation of the output shaft 25 of the step-down gear 20 during which the speed of the shaft 27 increases, then remains constant and finally decreases to zero, and a second stage corresponding to one quarter of a revolution of the shaft 25 during which the speed of the shaft 27 remains at zero.

By virtue of the described device the conveyor 1 which receives the objects to be printed and feeds them below the printing cylinders is driven with an intermittent movement comprising halt stages during which the object to be printed can be easily loaded onto the seat 15 provided on the conveyor 1, and printing stages during which the conveyor moves at a constant speed exactly equal to the peripheral speed of the printing plates 71 provided on the printing cylinder 77 and at the peripheral speed of the cylinder 66.

The printing cylinders 66 and 77 are rotated by independent mechanical transmissions connected to the motor 18 at a constant speed such that the respective peripheral speeds are exactly equal to the linear speed of advancement of the conveyor 1 during the periods in which it moves at constant speed.

In the illustrated embodiment, relating to the printing of compact discs, the conveyor 1 is composed of 72 plates 10, has a distance between the axes of the toothed wheels of 3600 mm, and supports 36 seats 15 for receiving compact discs 3.

If the peripheral speed of the printing means is 40 m/min, 100 objects can be printed per minute.

We claim:

1. A printing machine of offset type for flat objects of the type comprising a flat object carrying conveyor for feeding the objects to be printed to a printing station of offset type having at least one printing cylinder for at least one colour, said cylinder being driven with uniform rotary movement by cylinder drive means, further comprising:

a chain link conveyor having a rectilinear upper portion;

means positioned at regular intervals along said chain link conveyor to receive the object to be printed and maintain it in position;

means for driving said chain link conveyor with intermittent movement in which halt periods alternate with periods during which the speed increases, then remains constant and then decreases;

said printing station comprising a printing cylinder of offset type;

means for loading and discharging the objects onto and from the chain link conveyor, and operated in synchronism with its halt periods.

2. A machine as claimed in claim 1, wherein the conveyor links are plates which at their mutual hinging points are guided by guide means to undergo a circumferential trajectory as said plates approach and recede from said means for loading and discharging said objects tangential to a rectilinear trajectory.

3. A printing machine of offset type for flat objects of the type comprising a flat object carrying conveyor for feeding the objects to be printed to a printing station of offset type having at least one printing cylinder for at least one colour, said cylinder being driven with uniform rotary movement by cylinder drive means, further comprising:

a chain link conveyor having a rectilinear upper portion;

means positioned at regular intervals along said chain link conveyor to receive the object to be printed and maintain it in position;

means for driving said chain link conveyor with intermittent movement in which halt periods alternate with periods during which the speed increases, then remains constant and then decreases;

said printing station comprising a printing cylinder of offset type;

means for loading and discharging the objects onto and from the chain link conveyor, and operated in synchronism with its halt periods;

at least the rectilinear upper portion of the chain link conveyor being guided within suitable slide tracks which receive idle lateral wheels mounted on the hinging axes of the chain links; and idle central wheels mounted on the chain links with their axis perpendicular to the hinging axes of the chain links.

4. A printing machine of offset type for flat objects of the type comprising a flat object carrying conveyor for feeding the objects to be printed to a printing station of offset type having at least one printing cylinder for at least one colour, said cylinder being driven with uniform rotary movement by cylinder drive means, further comprising:

a chain link conveyor having a rectilinear upper portion;

means positioned at regular intervals along said chain link conveyor to receive the object to be printed and maintain it in position;

means for driving said chain link conveyor with intermittent movement in which halt periods alternate with periods during which the speed increases, then remains constant and then decreases;

said printing station comprising a printing cylinder of offset type;

means for loading and discharging the objects onto and from the chain link conveyor, and operated in synchronism with its halt periods; and a slab is laterally supported by idle aligned wheels and is fixed to those chain links which are intended to support the objects to be printed.

5. A printing machine of offset type for flat objects of the type comprising a flat object carrying conveyor for feeding the objects to be printed to a printing station of offset type having at least one printing cylinder for at least one colour, said cylinder being driven with uniform rotary movement by cylinder drive means, further comprising:

a chain link conveyor having a rectilinear upper portion;

means positioned at regular intervals along said chain link conveyor to receive the object to be printed and maintain it in position;

means for driving said chain link conveyor with intermittent movement in which halt periods alternate with periods during which the speed increases, then remains constant and then decreases;

said printing station comprising a printing cylinder of offset type;

means for loading and discharging the objects onto and from the chain link conveyor, and operated in synchronism with its halt periods; and the means which drive the chain link conveyor with intermittent movement comprise a shaft mounting a toothed wheel driving the chain link conveyor and a movement regulator in which two antisymmetrical parallel cams driven with uniform movement each interfere with one of two identical circumferential series of rollers supported by a shaft connected to the shaft of the toothed wheel driving the chain link conveyor.

* * * * *